United States Patent

Keating

[15] 3,646,882
[45] Mar. 7, 1972

[54] FILTER FOR DEEP FRYER

[72] Inventor: Richard T. Keating, 4301 West Madison St., Chicago, Ill. 60624

[22] Filed: May 28, 1969

[21] Appl. No.: 828,672

[52] U.S. Cl. ............................................99/408, 210/167
[51] Int. Cl. .......................................................A47j 37/12
[58] Field of Search ..............................99/408, 403–404, 99/405–406, 444; 62/67, 123; 210/153, 155, 162, 167–168, 171, 185, 203, 209, 295

[56] References Cited

UNITED STATES PATENTS

| | | | |
|---|---|---|---|
| 2,073,442 | 3/1937 | Briggs | 210/168 |
| 2,335,532 | 11/1943 | Ream | 210/168 |
| 2,578,129 | 12/1951 | Daugherty | 99/408 |
| 3,049,240 | 8/1962 | Smith | 210/295 |
| 3,099,623 | 7/1963 | Kaufer | 210/167 |
| 3,203,754 | 8/1965 | Young et al. | 210/167 X |
| 3,210,193 | 10/1965 | Martin | 99/403 UX |
| 3,263,596 | 8/1966 | Thomas | 99/408 |
| 3,415,181 | 12/1968 | Hart | 99/408 |
| 3,447,685 | 6/1969 | Bircher | 210/167 |
| 3,495,525 | 2/1970 | Piotrowski | 99/403 X |

*Primary Examiner*—Edward L. Roberts
*Assistant Examiner*—Arthur O. Henderson
*Attorney*—Rummler and Snow

[57] ABSTRACT

A multilayered filter element for deep fryers characterized by both the efficiency of filtering and sweetening action and ease of replacement. In one embodiment the filter element is formed as an elongated member having layers of filtering media of different particle size or porosity through which the liquid to be filtered is passed. In another embodiment the filter element has a combination of a fibrous filtering media and a finely divided absorbent material in alternate layers. A tubular filter element is disclosed having a wall composed of an inner layer of coarse filter paper, an intermediate layer of medium filter paper and an outer layer of fine filter paper, with diatomaceous earth or the equivalent interposed between the layers. The filter element is provided with a wall having engaging means whereby the filter can be readily removed from the fryer. In another embodiment a filter trough is provided into which the liquid fat overflows and passes through interposed layers of graded filter media. Other embodiments are disclosed.

13 Claims, 9 Drawing Figures

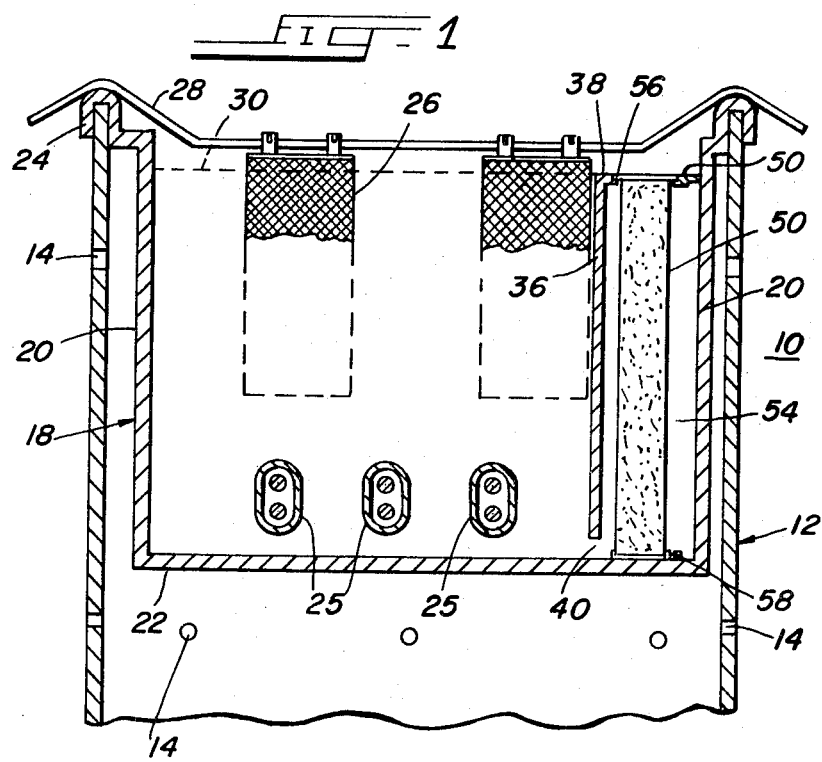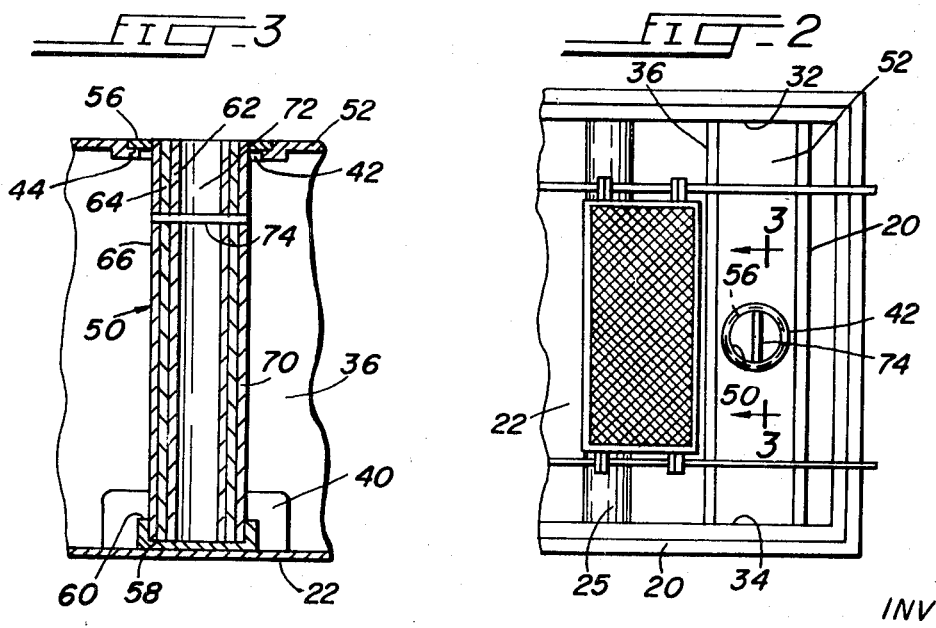

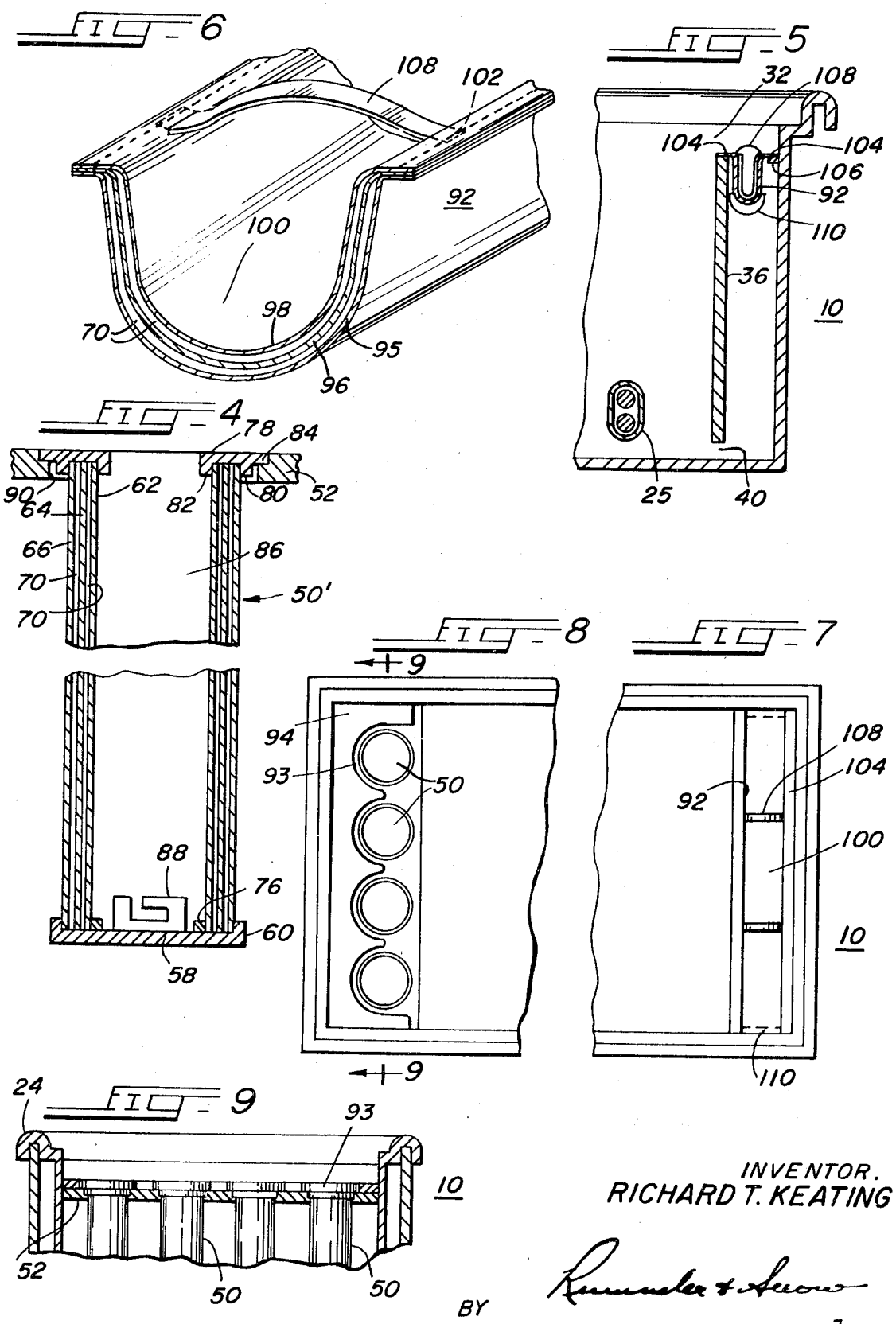

FILTER FOR DEEP FRYER

BACKGROUND OF THE INVENTION

It was customary in deep fryers to locate the direct fire-heating elements for the frying fat at or adjacent the base of the vessel and depend upon convection currents to circulate the fat into contact with the food to be cooked, which is generally suspended in baskets within the top part of the vessel. The lower portion of the vessel nearest the heat source, becomes superheated, and any food particles that are dropped or are carried into the liquid fat from the fryer baskets ultimately contact the lower reaches of the vessel where excessive heat causes the rapid formation of charred or carbonized food particles and other decomposition products. Such products accumulate rapidly and cause the discoloration of the fat, hasten the need to replace the fat, and often adversely affect the taste and appearance of the food being treated. Wide mesh screens have been used in early types of deep fryers, such as described in U.S. Pat. No. 2,061,533, to keep the food particles from settling into the heated base of the vessel.

Something more than screens is necessary to meet the modern standards of commercial deep fryers since the fat must now be kept free of food particles and materials causing contamination of the fat by unwanted tastes and odors. The use of fine filters has not been desirable because they impede the required rapid convection flow of liquid fat through the vessel. More costly pumps and bypass filters have been used to solve this problem as disclosed in U.S. Pat. No. 2,578,129. Indirect heat exchange elements in the form of combustion tubes extending through the fat, as shown in U.S. Pat. No. 2,712,308 have eliminated the formation of superheated zones in the vessel and prevented to some extent the accumulation of food particles adjacent high temperature heating surfaces. However, even and rapid circulatory flow of the liquid fat is necessary to the proper heat balance within the vessel and the use of fine filters in the main circulatory path of the fat upsets this heat balance. Also there is danger of fire due to clogging of the filters and overheating of the stagnated fat.

One solution to this problem is disclosed in U.S. Pat. No. 3,263,596 wherein the filter screens are located below the heating elements as a bottom wall by means of thermal barrier side plates forming an inner receptacle within an outer vessel. The top edges of the barrier plates act as a weir allowing the circulating fat to pass over and down as an auxiliary flow, during cooking or on-off cycles, into a space between the plates and the sides of the outer vessel, up through the filter, past the heating elements and into contact with the food basket. If the filter becomes clogged circulation of the liquid fat can still take place within the confines of the inner receptacle defined by the plates and the top of the filter. However, in a deep fryer of this construction there is no provision for replacement of the filter screen and filter paper, without draining the vessel. Thus, the tendency is to use the filters to the extent of their filtering action because of the time and labor involved in replacement. Not all of the liquid fat is subjected to filtering, that is, the filtering action is intermittent and in order to maintain a pressure differential across the filter the auxiliary stream is cooled. This represents added and unnecessary parts and heat losses.

SUMMARY OF THE INVENTION

In accordance with this invention, the foregoing disadvantages are eliminated and efficient filtering action maintained upon all of the circulating liquid fat by the use of filter cartridges which are effectively placed in the circulating stream and conveniently replaced without the necessity of draining the vessel or for that matter even stopping the cooking process. This invention also concerns the use of multiple layer filter means having greatly increased filtering action which prolongs the useful life of the cooking oil or fat.

In one embodiment the deep fryer is an open-topped vessel adapted to contain the liquid fat and into which the food is suspended in baskets, and is provided with an overflow filter chamber having an open top and an opening at the bottom communicating with the bottom zone of the vessel wherein are located the heating elements. The open top of the filter chamber is in communication with the liquid fat ebullating from the top of the vessel and the bottom of the chamber communicates with the lower heated zone of the liquid fat. A multiple removable layered filter element is interposed in the filter chamber so that the overflowing liquid fat passes through the filter element in its cyclic passage through the chamber. The filter means is characterized by providing a multilayer filter media wall through which all of the bypassed portion of liquid fat is conducted by natural convection flow. In one embodiment the filter means is in the form of a tubular element adapted to fit within the bypass chamber and spaced from the walls thereof so that the liquid fat flows from within the tubular element radially outward into the space around the filter element and thence into the heating zone. The bypass chamber is a section of the vessel separated from the main heating zone by a discontinuous wall that has an opening at the bottom communicating with the heating zone. The filter means may also comprise a trough-shaped cover member for part or all of the bypass section to catch the overflowing stream of liquid fat as it passes over the wall, subject it to filtration and allow the filtrate to descend and pass under the wall to the heating zone. Means are provided whereby the filter elements can be engaged and easily removed from the deep fryer.

DESCRIPTION OF THE DRAWINGS

Illustrative embodiments of this invention are shown in the drawings in which:

FIG. 1 is a side view, partially in section, illustrating the environment of the structures of this invention;

FIG. 2 is a fragmentary top plan view of the deep fryer shown in FIG. 1;

FIG. 3 is a cross-sectional view taken along the lines 3—3 of FIG. 2;

FIG. 4 is a cross-sectional view of a modified tubular filter element or cartridge in accordance with this invention;

FIG. 5 is a fragmentary side view in section, with the food baskets removed of a deep fryer and a modified filter element in accordance with this invention.

FIG. 6 is an enlarged fragmentary cross-sectional view of the modified filter element shown in FIG. 5;

FIG. 7 is a fragmentary top plan view of the embodiment shown in FIG. 5;

FIG. 8 is a fragmentary top plan view like FIG. 7 only showing multiple tubular filter elements; and FIG. 9 is a fragmentary cross-sectional view taken along the lines 9—9 of FIG. 8.

DESCRIPTION OF THE PREFERRED EMBODIMENTS

Referring to FIGS. 1, 2 and 3, an illustrative embodiment of this invention is shown wherein the deep fryer 10 includes the cabinet 12 forming an enclosure with apertures 14 in the sidewalls for air circulation in a manner known in this art. The cabinet supports the vat 18 having the end walls 20 and the bottom 22 by any suitable means such as the provision of the interlocking rolled flange edge 24. The heater elements are illustrated at 25 and can be electrical or of the flue-type.

The fry baskets 26 are supported by the brackets 28 in a manner to be removable and to suspend the contents of the baskets within the cooking fat within the vat 18, the liquid level of which is indicated at 30. The vat 18 has the sidewalls 32 and 34 which support therebetween the weir or thermal barrier plate 36 having the flat top edge 38 over which the liquid fat pours during the cooking process. The weir plate 36 is continuous across the vat from sidewall 32 to the sidewall 34 except that there is provided the opening 40 adjacent the bottom wall 22. If desired, the opening 40 can extend from wall 32 to wall 34 across the entire bottom of the vat.

As shown in FIGS. 2 and 3, a cover plate 52 closes the top of the space 54 between the weir plate 36 and the sidewall 20 of the vat and an opening 42 having a recessed flange 44 is formed in the cover plate. Thus, any overflowing liquid fat is conducted to the opening 42 and flows downwardly into the filter element 50.

The filter element 50 has a top collar 56 which seats upon the flange 44 and is provided with a cuplike bottom closure 58, having a flange 60. The filter comprises multiple tubular filter layers 62, 64 and 66 which are various grades of filter paper between which are annular layers of absorbent material 70. This structure is better illustrated in FIG. 4 which is enlarged to show spaces between the layers of filter media in which the absorbent material is disposed.

The layers of filter paper 62, 64 and 66 with intermediate tubular filter element, comprising the layers of discrete absorbent material 70 can be constructed in any form as long as a top opening to the interior, 72 in FIG. 3 and 86 in FIG. 4, is provided so that the liquid fat is caught therein and filters out radially into the space 54 around the filter and thence through the under side or aperture 40 of the weir plate to the vat and into contact with the heaters 25. Any means can be used to attach the tubes of filter paper to each other and to their respective top and bottom collar and closure means 56 and 58 so as to form a unitary filter cartridge that is rugged, will not come apart and will withstand the hot liquid fat. The bottom plate 58 closes the end of the filter so that all debris and food particles in the overflow stream are trapped and do not return to the system.

To facilitate removal of the filter element, a cross pin 74 is provided which can be suitably riveted or otherwise fastened through the filter paper layers as illustrated. To remove the used filter it is only necessary to engage the pin 74 with a suitable hook and pull it upwardly from the collar 42. The collar 56 and the opening of the flange 44 are larger than the base 58 so that the latter clears in this operation.

Referring to FIG. 4 the modified filter cartridge 50' is shown to have a cuplike bottom 58 and an inner retaining ring 76 defining an annular space with the outer flange 60 to secure the end part of the filter media between them. The ring 76 can be a C-ring with a spring action to clamp the filtering material in place against the flange 60. The top retainer ring or collar 78 has a pair of annular flanges 80 and 82 between which the filter cartridge is engaged by press fitting and the use of oil resistant adhesives on the contacting surfaces. Such adhesives can also be used to fasten the bottom closure plate 58 to the filter cartridge. The top ring 78 has the outer radial flange 84 which seats within the cover plate 52 and the top surface of the plate 52 is flush with the ring 78 so there is no impedance of flow of fat into the filter.

The modified filter 50' shown in FIG. 4 is intended to illustrate a larger capacity filter such as may be used in the embodiment shown in FIGS. 1 and 2 wherein only one filter cartridge is used. Being of larger capacity its weight when filled with liquid fat will be greater and accordingly to prevent rupture of the soaked filter paper, this unit is lifted from the bottom so that the entire mass is supported on the plate 58. To accomplish this the lug 88 is provided and affixed inside the filter cartridge to the plate 58. This lug is a bayonet type element and is engaged by a suitable elongated tool (not shown) having a hook at the end which is inserted into the center of the cartridge. The opening 90 in the plate 52 is large enough to allow easy passage of the plate 58.

FIGS. 8 and 9 illustrate the use of a series of filter cartridges 50, in the bypass chamber 54, each having its upper supporting ring located within a respective recess 93 of a horizontal weir 94 supported by the plate 52.

FIGS. 5, 6 and 7 illustrate a trough-type of filter 92 formed of layers of filter paper nested in face-to-face relation to include the outer layer 95, the intermediate layer 96 and the inner layer 98 with the bands of absorbent media 70 therebetween. The filter 92 is elongated and has the depression 100 therealong. The edges of the individual layers are contiguous on both sides and fastened to each other by stapling or a sew line 102. Suitable stiffening ribs of plastic or the like can be incorporated in the edges. This forms a supporting strengthened flange 104 along each side of the filter trough so that it can be laid upon the top edge of the weir plate 36 on one side and along the flange 106 of the modified vat shown in FIG. 5. In this instance the opening 40 will extend the entire length of the weir plate 36 so there are no areas to collect debris and the like in case of accidental misplacement of the filter element. The filter 92 can also be sewn at other areas between the two flanges to aid in place retention of the intermediate absorbent media 70 and prevent pocketing. Stiffened gauze which is oil resistant can be used for reinforcement. Wire mesh reinforcement can be used.

In order to strengthen the trough filter 92 and provide a means to grasp and lift it into place and also remove it when its filtering action is dissipated, a pair or more of bridge handles 108 made of stiff plastic or metal straps are provided. The ends of the straps 108 are engaged by staples or included in the sew line 102 in assembly of the trough filter 92, A cup-shaped support 110 can be provided at each end of the trough filter, if desired, in order to provide a partial seal and insure that the filter remains in place.

The filter paper used to construct the filters 50, 50' and 92 of this invention can be of any desired strength, grade and thickness in order to accomplish the intended purpose. Such papers can be made of pure white cotton fibers, having retention numbers of 2-3. Examples of suitable filter papers are those which will retain gelatinous precipitates, protein precipitates, coarse fibers and organic solids, such as the Munktell paper No. 1F or No. 8; those papers having clarifying properties such as Sargent No. 500 and No. 501 types of filter paper used commercially in filter presses and the like having fairly rapid filter action and the ability to retain agglomerates, carbomaceous materials, charred materials and most of the finer particles present in the liquid fat. High-strength papers are preferred.

The filter absorbent material 70 can be any of the powdered or granular inorganic filter materials adapted to remove acids, color and other obnoxious materials from the fat. For this purpose finely divided metal oxides, diatomaceous earth, Kieselguhr, infusorial earth, celite, silica, asbestos, clays, glass wool, introcellulose, powdered limestone, alundum, cellulose strands, aluminum hydroxide, bone black, activated charcoal, magnesium carbonate, quartz, sand and talc can be used.

The filter paper layers 62, 64 and 66 or the filter paper layers 94, 96 and 98 can be of the same or different grades and having the same or differing degrees of filtering abilities. Thus, these layers can be constructed so that the inner layers 62 and 98 are coarse paper holding only the larger particles, the intermediate layers 64 and 96 can be a finer grade of paper to hold finer particles which pass through the first layer and the last layer 66 and 94 can be the finer grades of paper to filter out the very finest particles. The papers can be arranged in reverse order of filtering ability if desired.

Likewise, the layers of absorbent filter material 70 can be the same or different. One material can have high-decolorizing ability while the other can have neutralizing properties to remove the high molecular weight carboxylic acids and glycerols formed as a result of the heat decomposition and deesterification of the glycerides. Filter media adapted to remove soaps formed in the decomposition process and also liquids that are present in vegetable and animal oils can be used. Those filter media, whether fibrous or absorbent earth types, that decolorize and remove materials that become rancid are preferred, such as diatomaceous earth, infusorial earth, clays, silica, powdered limestone, activated charcoal and bone black. Mixtures of these materials can be used and good results are obtained with diatomaceous earth and activated charcoal as single layers in the same filter or as mixtures in the layers of the same filter.

What is claimed is:

1. A deep fat fryer vessel comprising:

a. a vat adapted to contain a volume of liquid fat for frying articles of food;
b. heating means in a lower portion of said vat;
c. a compartment in one side of said vat, said compartment defining a passageway having a top opening at the liquid level of said volume of liquid fat and a bottom opening communicating with the lower portion of said vat, whereby fat overflowing from said vat into said compartment and cooled by convection will be returned to the bottom of said vat; and
d. a filter element removably disposed within said compartment from the top opening thereof and forming a wall of filtering material across the said passageway through which the flow of liquid fat passes for return to the vat.

2. A deep fryer vessel in accordance with claim 1 in which: said filter element is tubular in form and extends downwardly into said passageway, said filter element has an open end at the top opening of said passageway and a closed bottom end, and means is provided to close the top of the passageway except for the open end of the filter element whereby liquid fat displaced from said vat cyclically enters the open end of said tubular filter element and passes radially outward therefrom into said compartment for circulation through the bottom opening of said compartment into the lower portion of said vat.

3. A deep fryer vessel in accordance with claim 1 in which said filter element comprises an elongated trough made of a filtering material recessed into and covering the top opening of said compartment.

4. A deep fryer vessel in accordance with claim 1 in which the wall of said filter element comprises a plurality of layers of a filtering sheet material alternating with layers of a discrete solid filter material.

5. A deep fryer vessel in accordance with claim 4 in which:
a. said layers of filtering sheet material are of progressively finer porocity in the direction of flow of the liquid fat therethrough, and
b. said discrete solid filter material comprises a granular material adapted to decolorize and deodorize said liquid fat.

6. A deep fat fryer vessel in accordance with claim 1 wherein:
a. said top opening of said compartment is elongated and provided with upwardly facing edge surfaces at its opposite sides; and
b. said filter element comprises an elongated trough-shaped porous member having elongated flat outwardly projecting flanged edges in the plane of the open trough;
c. said filter element being adapted to be held within the top opening of said compartment with the flat flanged edges thereof supported by the edges of said opening.

7. A deep fryer vessel in accordance with claim 6 in which:
a. a handle means is provided extending across said trough between said flanged edges.

8. A deep fat fryer in accordance with claim 6 in which:
a. said filter element comprises spaced parallel layers of filter paper in nested face-to-face relation; and
b. the space between the layers contains a discrete particulate absorbent material of the group consisting of diatomaceous earth, infusorial earth, clay, silica, limestone, activated charcoal, bone black, and mixtures thereof.

9. A deep fryer vessel comprising a vat adapted to contain a volume of liquid fat for frying articles of food, heating means in a lower portion of said vat, a compartment in one side of said vat defining a passageway having a top opening at the liquid level of said volume of liquid fat and a bottom opening communicating with the lower portion of said vat, and a filter element removably disposed within said compartment from the top opening thereof and forming a wall of filtering material across the said passageway through which the convection flow of liquid fat overflowing from the vat into the compartment passes for return to the vat; and in which
a. said top opening of said compartment is circular having a recessed flange thereabout;
b. said filter element comprises an open ended tubular member and includes
c. a top collar affixed to the periphery of said member; and
d. a bottom closure affixed to the bottom end of said member and closing the same, said bottom closure being of lesser diameter than the opening of said compartment;
e. said top collar of said filter element seating on the recessed flange of the top opening of said compartment whereby said liquid fat continuously cycles from the top of said vat into the top end of said filter element, through the walls thereof into said compartment and through the bottom opening of the compartment into said vat.

10. A deep fat fryer in accordance with claim 9 in which:
a. said tubular member comprises concentric walls of a paper filter medium radially spaced from one another; and
b. the space between said walls contains a discrete particulate material of the group consisting of diatomaceous earth, infusorial earth, clay, silica, limestone, activated charcoal and bone black, and mixtures thereof.

11. A deep fryer vessel in accordance with claim 9 in which said filter element has means therein adapted to be engaged to lift said filter from said compartment.

12. A deep fryer vessel in accordance with claim 11 in which said means comprises a crossbar located intermediate the ends of said filter.

13. A deep fryer vessel in accordance with claim 11 in which said means comprises a bayonet-slotted element in the bottom of said filter.

* * * * *